United States Patent
Koyauchi et al.

(10) Patent No.: US 10,414,177 B2
(45) Date of Patent: Sep. 17, 2019

(54) CUTTING APPARATUS

(71) Applicant: Roland DG Corporation, Hamamatsu-shi, Shizuoka (JP)

(72) Inventors: Yasuo Koyauchi, Hamamatsu (JP); Takeshi Tozuka, Hamamatsu (JP); Hironobu Suzuki, Hamamatsu (JP); Yujiro Fujinawa, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 23 days.

(21) Appl. No.: 14/672,306

(22) Filed: Mar. 30, 2015

(65) Prior Publication Data
US 2015/0290954 A1    Oct. 15, 2015

(30) Foreign Application Priority Data
Apr. 9, 2014  (JP) .................. 2014-080549

(51) Int. Cl.
| | |
|---|---|
| B41J 11/66 | (2006.01) |
| B41J 11/70 | (2006.01) |
| B26D 1/04 | (2006.01) |
| B62D 7/22 | (2006.01) |

(52) U.S. Cl.
CPC .............. *B41J 11/70* (2013.01); *B26D 1/045* (2013.01); *B41J 11/66* (2013.01); *B62D 7/22* (2013.01)

(58) Field of Classification Search
CPC .. B26D 1/045; B26D 7/22; B41J 11/66; B41J 11/70
See application file for complete search history.

(56) References Cited

U.S. PATENT DOCUMENTS

| | | | |
|---|---|---|---|
| 4,074,602 A * | 2/1978 | Brower | B27B 5/20 192/129 A |
| 5,042,155 A | 8/1991 | Yoshioka et al. | |
| 5,680,802 A * | 10/1997 | Murray | B23D 59/001 144/215.2 |
| 6,050,168 A * | 4/2000 | Kuchta | B26D 5/005 83/522.11 |
| 6,216,756 B1 * | 4/2001 | Mason | B27B 31/003 144/246.2 |

(Continued)

FOREIGN PATENT DOCUMENTS

| | | |
|---|---|---|
| CN | 101237972 A | 8/2008 |
| CN | 101486201 A | 7/2009 |

(Continued)

*Primary Examiner* — Kenneth E Peterson
*Assistant Examiner* — Liang Dong
(74) *Attorney, Agent, or Firm* — Keating & Bennett, LLP

(57) ABSTRACT

A cutting apparatus includes a carriage movable in a predetermined direction, a moving mechanism moving a work material in a direction intersecting the predetermined direction, a cutter mounted on the carriage, a cutter moving mechanism mounted on the carriage and moving the cutter in directions toward and away from the work material, a light source mounted on the carriage, and a controller controlling the light source. When the cutting apparatus is in a normal condition, the controller controls the light source to be in a first illuminating state, and when the cutting apparatus is in an abnormal condition, the controller controls the light source to be in a second illuminating state.

4 Claims, 5 Drawing Sheets

(56) References Cited

U.S. PATENT DOCUMENTS

| | | | | |
|---|---|---|---|---|
| 6,263,773 B1* | 7/2001 | McAdoo | ............... | B27B 31/003 |
| | | | | 144/357 |
| 2007/0163408 A1* | 7/2007 | Buck | ....................... | B27G 19/02 |
| | | | | 83/438 |
| 2009/0071305 A1 | 3/2009 | Myers et al. | | |
| 2010/0064869 A1* | 3/2010 | Poole | ....................... | B27B 27/04 |
| | | | | 83/72 |
| 2011/0283849 A1* | 11/2011 | Takizawa | ............... | B26D 5/005 |
| | | | | 83/13 |

FOREIGN PATENT DOCUMENTS

| | | |
|---|---|---|
| CN | 201382302 Y | 1/2010 |
| CN | 101659065 A | 3/2010 |
| CN | 101842200 A | 9/2010 |
| CN | 201680296 U | 12/2010 |
| CN | 103286808 A | 9/2013 |
| CN | 203197682 U | 9/2013 |
| JP | 01-200999 A | 8/1989 |
| JP | 03-20816 A | 1/1991 |
| JP | 07-266789 A | 10/1995 |
| JP | 2011-218456 A | 11/2011 |
| WO | 2007/011794 A2 | 1/2007 |

* cited by examiner

CUTTING APPARATUS

The present application claims priority from Japanese Patent Application No. 2014-80549, filed on Apr. 9, 2014, which is incorporated by reference herein in its entirety.

BACKGROUND OF THE INVENTION

1. Field of the Invention

The present invention relates to a cutting apparatus suitable for cutting a sheet, a plate-shaped material, or the like.

2. Description of the Related Art

A cutting apparatus for cutting a work material such as a sheet has been known. JP 2011-218456 A discloses a cutting apparatus having a carriage configured to be two-dimensionally movable relative to a work material, and a cutter mounted to the carriage. It should be noted that the term "cutting" used in the present description is meant to include partial cutting of a work material across its thickness, as well as cutting of the work material across its entire thickness.

Generally, a cutting apparatus is provided with a display panel for displaying the status of the cutting apparatus, such as whether or not the cutting apparatus is in operation, or whether or not there is an abnormal condition occurring in the cutting apparatus. In order to recognize the status of the cutting apparatus, the operator needs to check the display panel. However, when a large-sized cutting apparatus is used or when the operator is located away from the cutting apparatus, for example, it is difficult for the operator to recognize the status of the cutting apparatus quickly, which has been a problem.

SUMMARY OF THE INVENTION

Preferred embodiments of the present invention provide a cutting apparatus that enables an operator to recognize a status of the cutting apparatus quickly.

A cutting apparatus according to a preferred embodiment of the present invention includes a carriage movable in a predetermined direction; a moving mechanism configured to move a work material in a direction intersecting the predetermined direction; a cutter mounted to the carriage; a cutter moving mechanism mounted on the carriage and configured to move the cutter in a direction approaching the work material and in a direction moving away from the work material; a light source mounted on the carriage and configured to emit light; and a controller configured or programmed to control the light source, wherein, when the cutting apparatus is in a normal condition, the controller controls the light source so that the light source is in a first illuminating state, and when the cutting apparatus is in an abnormal condition, the controller controls the light source so that the light source is in a second illuminating state.

In the cutting apparatus according to a preferred embodiment of the present invention, the light source is disposed on the carriage that is movable in a predetermined direction. The light source is controlled by the controller so as to be lit in a first illuminating state when the cutting apparatus is in a normal condition and so as to be lit in a second illuminating state that is different from the first illuminating state when the cutting apparatus is in an abnormal condition. This enables the operator to recognize the status of the cutting apparatus simply by checking the illuminating state of the light source, which is mounted on the carriage. As a result, even when the operator is working at a location far away from the cutting apparatus, the operator is able to easily and reliably recognize the status of the cutting apparatus without checking its display panel. In particular, good visibility is ensured when the carriage is in motion, because the light source moves integrally with the carriage. Moreover, because the operator is able to perceive the status of the cutting apparatus from the illuminating state of the light source, the operator quickly and reliably recognizes the status of the cutting apparatus without checking the display panel even when the room in which the cutting apparatus is disposed is dark.

In one preferred embodiment of the present invention, when the cutting apparatus is in a normal condition, the controller controls the light source so that the light source is lit in a first pattern, and when the cutting apparatus is in an abnormal condition, the controller controls the light source so that the light source is lit in a second pattern.

The just-described preferred embodiment enables the operator to easily recognize whether the cutting apparatus is working properly or the cutting apparatus is in an abnormal condition by checking the illumination pattern of the light source.

In one preferred embodiment of the present invention, when the cutting apparatus is in a normal condition, the controller controls the light source so that the light source is lit in a first color, and when the cutting apparatus is in an abnormal condition, the controller controls the light source so that the light source is lit in a second color.

The just-described preferred embodiment enables the operator to easily recognize whether the cutting apparatus is working properly or the cutting apparatus is in an abnormal condition by checking the color of the light source.

In one preferred embodiment of the present invention, the cutting apparatus further includes a cover, being fitted to the carriage, including a light transmitting portion transmitting light emitted from the light source, and covering the cutter moving mechanism.

The just-described preferred embodiment makes it possible to increase the safety of the operator without impairing the visibility of the light source.

In one preferred embodiment of the present invention, the cutter moving mechanism includes a voice coil motor. The voice coil motor is covered by the cover, and the cutter is not covered by the cover.

The just-described preferred embodiment makes the maintenance of the cutter easier and also makes it possible to increase the safety of the operator.

In one preferred embodiment of the present invention, the light source is disposed upward or downward relative to the voice coil motor, where the predetermined direction is defined as a lateral direction, the direction in which the cutter approaches the work material is defined as a downward direction, and the direction in which the cutter moves away from the work material is defined as an upward direction.

In the just-described preferred embodiment, the light source is disposed away from the voice coil motor. This makes it possible to prevent the light source from causing faulty operations that originate from the heat generated by the voice coil motor.

Preferred embodiments of the present invention provide a cutting apparatus that enables the operator to easily and reliably recognize the status of the cutting apparatus quickly.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 5A-5G are timing charts concerning the brightness level of a light source, wherein FIG. 5A shows the brightness level for when the power is off, FIG. 5B shows the brightness level for when the power is on, FIG. 5C shows the brightness level for when the cutting apparatus is in an un-setup state, FIG. 5D shows the brightness level for when the cutting apparatus is in a setup state, FIG. 5E shows the brightness level for when the cutting apparatus is in a cutting operation, FIG. 5F shows the brightness level for when the cutting apparatus is not in operation, and FIG. 5G shows the brightness level for when the cutting apparatus is in an abnormal condition.

DETAILED DESCRIPTION OF THE PREFERRED EMBODIMENTS

Figure 1:
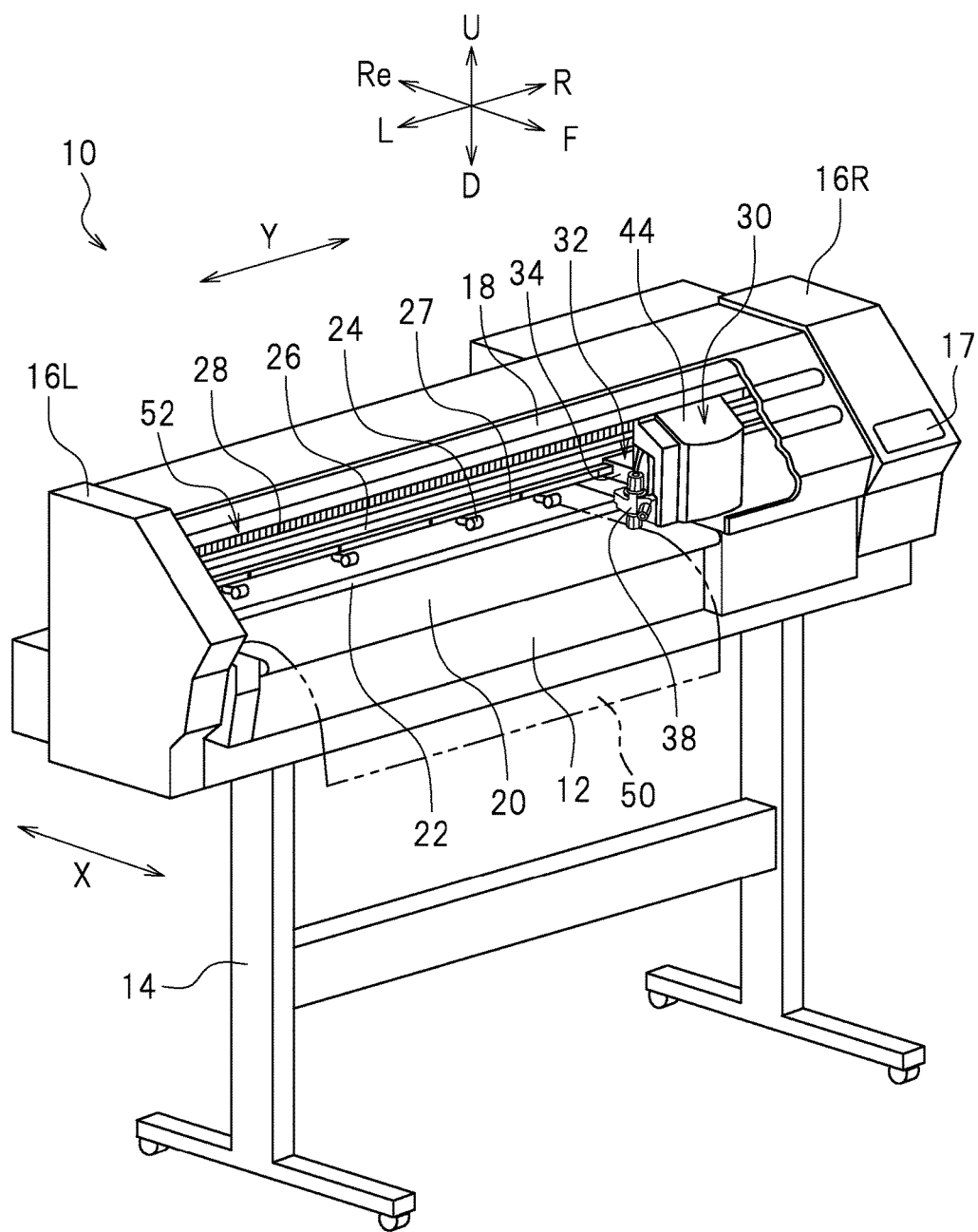
FIG. 1 is a perspective view illustrating a cutting apparatus according to a preferred embodiment of the present invention.

Hereinbelow, various preferred embodiments of the present invention will be described with reference to the drawings. As illustrated in FIG. 1, a cutting apparatus 10 according to the present preferred embodiment is an apparatus for cutting a work material 50 such as paper or sheet material into a desired shape, for example. It should be noted that the work material 50 is not limited to a sheet-shaped medium, but may be a plate-shaped material, such as a glass plate.

In the present description, the lateral direction (widthwise direction) of the work material 50 is referred to as a "primary scanning direction," as appropriate. In addition, a direction perpendicular to the primary scanning direction is referred to as a "secondary scanning direction," as appropriate.

In the following description, the terms "left," "right," "up," and "down" respectively refer to left, right, up, and down as defined based on the perspective of the operator facing the cutting apparatus 10. A direction approaching toward the operator relative to the cutting apparatus 10 is defined as "frontward," and a direction moving away from the operator relative to the cutting apparatus 10 is defined as "rearward." Reference characters F, Re, L, R, U, and D in the drawings indicate front, rear, left, right, up, and down, respectively. Reference character Y in the drawings indicates the primary scanning direction. In the present preferred embodiment, the primary scanning direction is a lateral direction, i.e., a left-to-right/right-to-left direction. Reference character X in the drawings indicates the secondary scanning direction. The secondary scanning direction X is a direction perpendicular to the primary scanning direction Y. In the present preferred embodiment, the secondary scanning direction is a front-to-rear/rear-to-front direction. It should be noted, however, that these directional terms are merely provided for convenience in illustration and should not be construed as limiting.

As illustrated in FIG. 1, the cutting apparatus 10 includes a main body 12, a left side cover 16L, a right side cover 16R, a center wall 18, a platen 20, a grid roller 22, pinch rollers 24, a guide rail 26, a belt 28, and a cutting head 30.

The main body 12 is supported by a stand 14. The main body 12 extends in the primary scanning direction Y. The left side cover 16L is provided at the left end of the main body 12. The right side cover 16R is provided at the right end of the main body 12. The main body 12 is provided with the center wall 18, which extends in a vertical direction. The center wall 18 extends in the primary scanning direction Y. The center wall 18 connects the left side cover 16L and the right side cover 16R to each other. The right side cover 16R is provided with an operation panel 17. The operation panel 17 displays the status of the cutting apparatus 10. The operation panel 17 may be provided on the left side cover 16L.

The main body 12 is provided with the platen 20 to support a work material 50. The platen 20 is provided with a cylindrical grid roller 22. The grid roller 22 is buried in the platen 20 in such a manner that its upper surface portion is exposed. The grid roller 22 is driven by a feed motor 62 (see FIG. 4). The grid roller 22 is one example of a feeding mechanism configured to move the work material 50 in a secondary scanning direction X. A plurality of pinch rollers 24 are disposed above the grid roller 22. The pinch rollers 24 are opposed to the grid roller 22. The pinch rollers 24 are configured so that their vertical positions are settable or adjustable according to the thickness of the work material 50. The work material 50 is sandwiched between the pinch rollers 24 and the grid roller 22. The grid roller 22 and the pinch rollers 24 are configured so as to be capable of conveying the work material 50 in a secondary scanning direction X while sandwiching the work material 50 therebetween.

The guide rail 26 is provided on the center wall 18. The guide rail 26 is disposed above the platen 20. The guide rail 26 is disposed parallel or substantially parallel to the platen 20. The guide rail 26 extends in the primary scanning direction Y. The guide rail 26 includes an engaging portion 27 protruding frontward.

The belt 28 is disposed parallel or substantially parallel to a wall surface of the center wall 18. The belt 28 extends in the primary scanning direction Y. The belt 28 is an endless belt. The belt 28 is wrapped around pulleys (not shown) provided at its right and left ends. One of the pulleys is connected to a carriage motor 60 (see FIG. 4) to drive the pulley. As the carriage motor 60 rotates, the pulley rotates accordingly, and the belt 28 travels in a primary scanning direction Y. The belt 28 and the guide rail 26 together define a moving mechanism 52.

Figure 2:
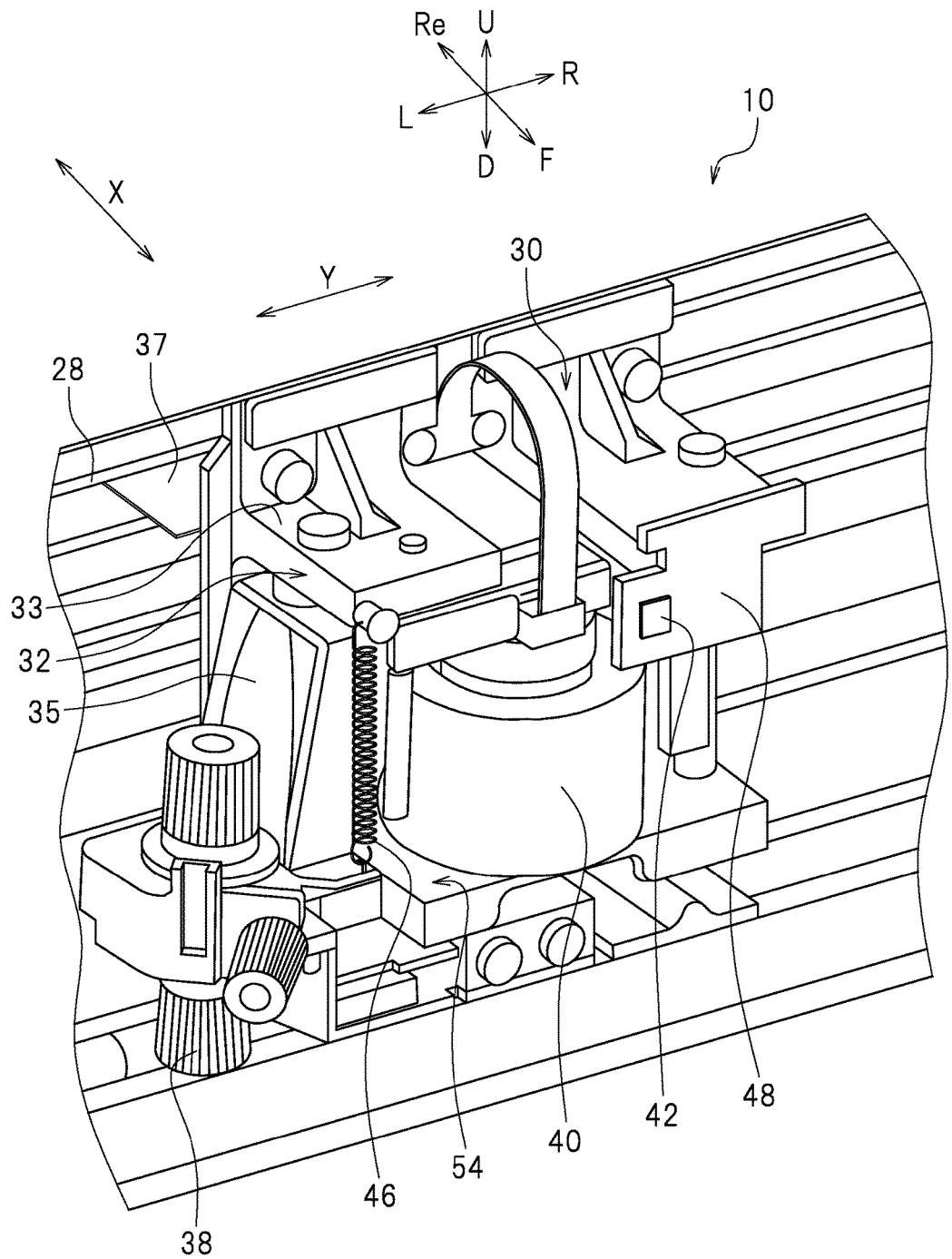
FIG. 2 is a perspective view illustrating a cutting head according to a preferred embodiment of the present invention.

The cutting head 30 is movable in a primary scanning direction Y along the guide rail 26. The cutting head 30 cuts the work material 50. As illustrated in FIG. 2, the cutting head 30 includes a carriage 32, a cutter 38, a cylindrically-shaped voice coil motor 40, a light source 42, and a cover 44 (see FIG. 3).

The carriage 32 is fitted slidably to the guide rail 26. The carriage 32 is secured to the belt 28. As the belt 28 travels, the carriage 32 moves in the primary scanning direction Y along the guide rail 26. The carriage 32 moves the cutter 38, the voice coil motor 40, and the light source 42 in the primary scanning direction Y. The carriage 32 is equipped with a carriage base 33 to support the cutter 38, the voice coil motor 40, and the light source 42. The carriage 32 includes a guide 34 (see FIG. 1) and a fastening plate 37. The guide 34 engages with the engaging portion 27 of the guide rail 26. The guide 34 is slidable relative to the guide rail 26. The fastening plate 37 is secured to the belt 28. The guide 34 and the carriage base 33 are preferably defined by separate elements, for example. The guide 34 and the carriage base 33 are secured to each other by a bolt or the like. It is also possible that the guide 34 and the carriage base 33 may be formed integrally with each other, for example. The carriage 32 is supported by the guide rail 26 at the rear end portion of the carriage 32. That is, the carriage 32 is cantilevered on the guide rail 26.

As illustrated in FIG. 2, the cutter 38 is mounted to the carriage 32. The cutter 38 is retained by a holder 35, which is movable upward and downward. The cutter 38 is disposed to the left of the holder 35. The cutter 38 may be disposed to the right of the holder 35. A spring 46 is provided between the holder 35 and the carriage base 33. The holder 35 is under an upward urging force provided by the spring 46. The holder 35 is connected to the voice coil motor 40. The holder 35 moves upward when receiving an upward force from the voice coil motor 40. The holder 35 moves downward when receiving a downward force from the voice coil motor 40. As a result, the cutter 38, retained by the holder 35, also moves upward and downward when receiving a driving force of the voice coil motor 40. The holder 35, the carriage base 33, the spring 46, and the voice coil motor 40 together define a cutter moving mechanism 54.

The voice coil motor 40 is mounted to the carriage 32. The voice coil motor 40 is supported by the carriage base 33. It is possible to use a known voice coil motor for the voice coil motor 40, for example. Since the configuration of the voice coil motor 40 is well known, the detailed description thereof will be omitted.

The light source 42 is mounted to the carriage 32. A circuit board 48 is provided on the carriage base 33. The light source 42 is disposed on the circuit board 48. The light source 42 is disposed frontward relative to the voice coil motor 40. The light source 42 is disposed upward relative to the voice coil motor 40. It is also possible to dispose the light source 42 downward relative to the voice coil motor 40. The light source 42 and the voice coil motor 40 may be disposed at positions that overlap with each other as viewed from the front. The light source 42 is not particularly limited as long as it is a member that emits light. Non-limiting examples of the light source 42 include a light emitting diode (LED), a laser diode (LD), and a vertical-cavity surface-emitting laser (VCSEL). In the present preferred embodiment, an LED is preferably used as the light source 42, for example. The circuit board 48 may be provided on an inner surface of the cover 44, instead of on the carriage base 33. It should be noted that the phrase "the light source 42 is mounted on the carriage 32" used in the present description means to include the case where the light source 42 is disposed on the circuit board 48 provided on the cover 44.

Figure 3:
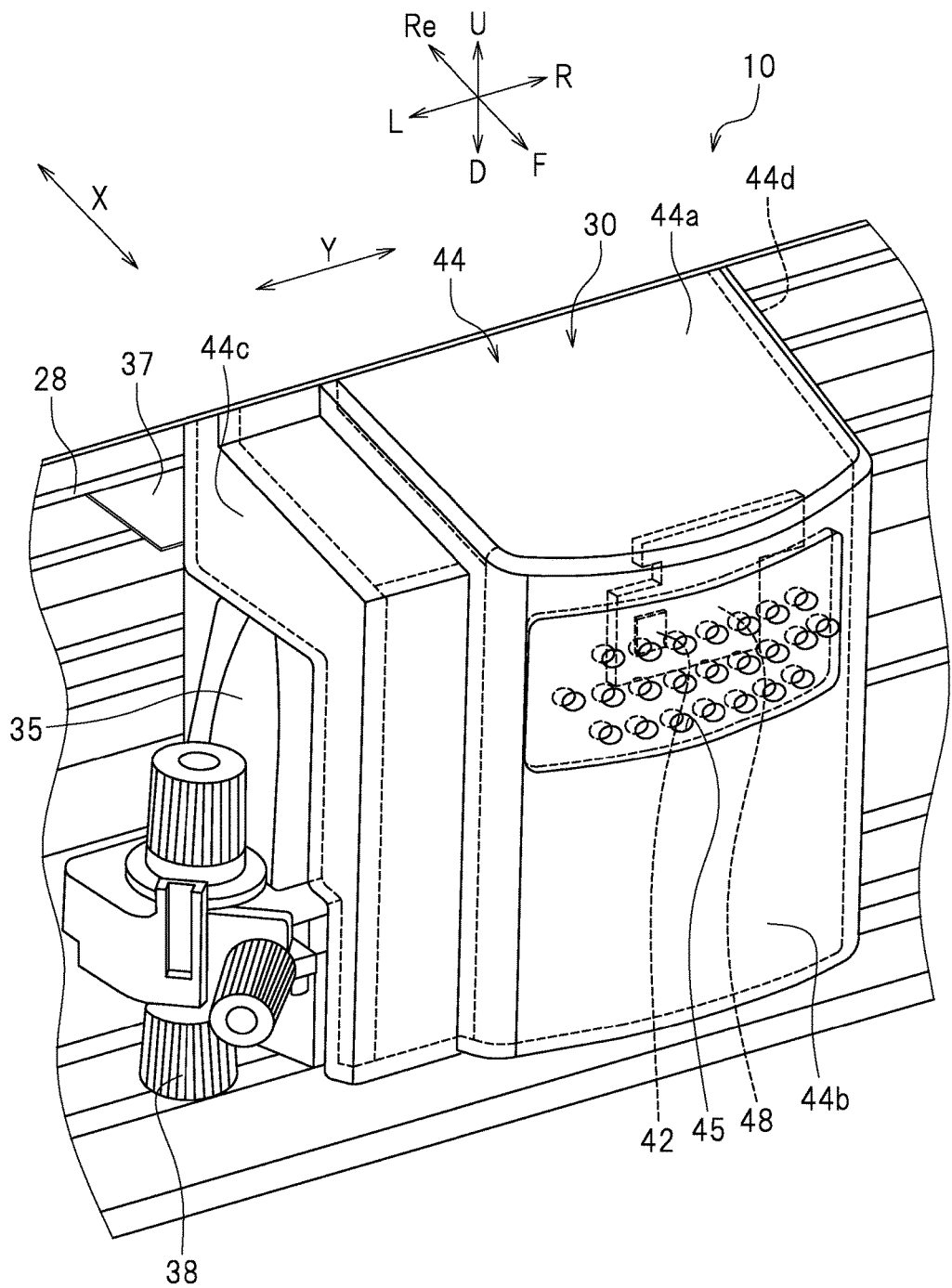
FIG. 3 is another perspective view illustrating a cutting head according to a preferred embodiment of the present invention.

As illustrated in FIG. 1, the cover 44 is fitted to the carriage 32. As illustrated in FIG. 3, the cover 44 includes an upper wall 44a, a front wall 44b, a left side wall 44c, and a right side wall 44d. The upper wall 44a extends in the primary scanning direction Y. The front wall 44b extends downward from the front end of the upper wall 44a. The left side wall 44c extends downward from the left end of the upper wall 44a. The right side wall 44d extends downward from the right end of the upper wall 44a. The front wall 44b connects the front end of the left side wall 44c and the front end of the right side wall 44d to each other. A light transmitting portion 45, which transmits the light emitted from the light source 42, is provided in the front wall 44b. In the present preferred embodiment, the light transmitting portion 45 preferably includes through-holes 45 penetrating the front wall 44b in the secondary scanning direction X.

The through-holes 45 may be covered by a material capable of transmitting light. It is also possible that the light transmitting portion 45 may include at least a portion of the front wall 44b of the cover 44 that is made of a material capable of transmitting light, such as a transparent acrylic resin. The cover 44 covers the cutter moving mechanism 54. The cover 44 covers the voice coil motor 40. The cover 44 covers the spring 46. The cover 44 covers the carriage base 33. The cover 44 covers a portion of the holder 35. The cover 44 covers the light source 42. The cover 44 does not cover the cutter 38. It is preferable that the light source 42 be disposed behind the light transmitting portion 45 of the cover 44. It is preferable that the light source 42 and the light transmitting portion 45 overlap with each other as viewed from the front.

Figure 4:
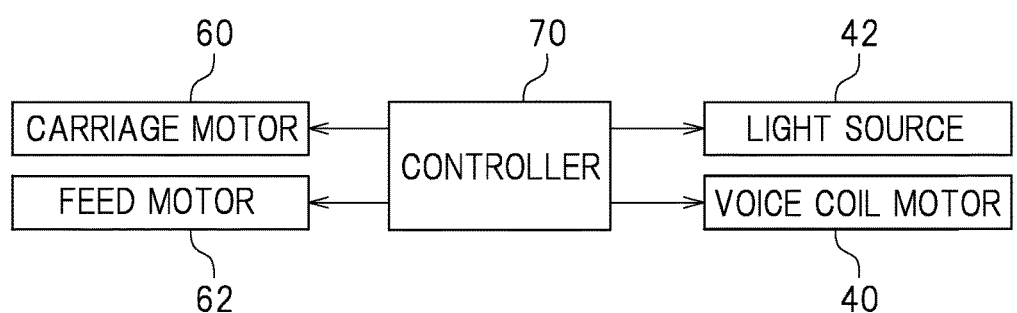
FIG. 4 is a block diagram illustrating a control system of the cutting apparatus according to a preferred embodiment of the present invention.

As illustrated in FIG. 4, the cutting apparatus 10 includes a controller 70. The operations of the cutting apparatus 10 as a whole is controlled by the controller 70. The controller 70 is operatively connected to the light source 42, the voice coil motor 40, the carriage motor 60, and the feed motor 62. The controller 70 is configured or programmed to control the above-identified components so that the work material 50 is cut into a predetermined desired shape. In the present preferred embodiment, a microcomputer is preferably provided as the controller 70, for example. The controller 70 is preferably disposed in the right side cover 16R (see FIG. 1). It is also possible to dispose the controller 70 in the left side cover 16L (see FIG. 1).

The controller 70 is configured or programmed to control the light source 42 according to the status of the cutting apparatus 10. FIGS. 5A to 5G show timing charts concerning the brightness level of the light source 42, wherein T represents time and I represents brightness level (%). FIGS. 5A to 5F show timing charts for when the cutting apparatus 10 is in a normal condition, and FIG. 5G shows a timing chart for when the cutting apparatus 10 is in an abnormal condition. As illustrated in FIGS. 5A to 5G, the controller 70 controls the illuminating state of the light source 42, i.e., the brightness level of the light source 42, by changing the electric current to be supplied to the light source 42 according to the status of the cutting apparatus 10. It should be noted that the timing charts shown in FIG. 5A) to 5G are merely examples of the timing charts concerning the brightness level of the light source 42, and they are not intended to limit the present invention in any way. More specifically, the time for which each of the brightness levels is continued is not particularly limited, but can be set as desired. It is also possible to set each of the brightness levels as desired. Furthermore, it is also possible to set the cycle of the brightness level as desired.

Figure 5A:
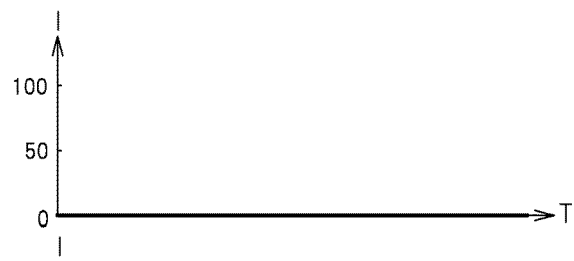
Figure 5B:
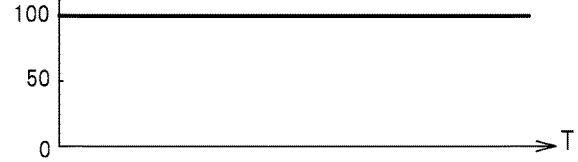
Figure 5C:
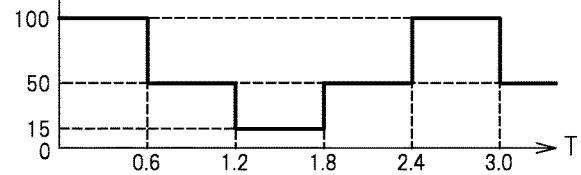

As illustrated in FIG. 5A, when the power of the cutting apparatus 10 is off, no power is supplied to the controller 70 either, so no electric current is supplied to the light source 42. Accordingly, the brightness level of the light source 42 is 0% (pattern 1). As illustrated in FIG. 5B, when the power of the cutting apparatus 10 is turned on, the controller 70 supplies electric current to the light source 42 so that the brightness level of the light source 42 becomes 100% (pattern 2). As illustrated in FIG. 5C, when the power of the cutting apparatus 10 is on and also the cutting apparatus 10 is in an un-setup state, the controller 70 supplies electric current to the light source 42 so that the brightness level of the light source 42 defines a cycle of 100%-50%-15%-50%-100% (pattern 3). In the present preferred embodiment, the time for which each of the brightness levels is continued preferably is set at about 0.6 seconds, for example. It should be noted that the term "un-setup state" herein means a state in which the work material 50 is not provided in the cutting apparatus 10, so that the cutting apparatus 10 cannot cut the work material 50.

Figure 5D:
Figure 5E:

As illustrated in FIG. 5D, when the power of the cutting apparatus 10 is on and also the cutting apparatus 10 is in a setup state, the controller 70 supplies electric current to the light source 42 so that the brightness level of the light source 42 becomes about 10% (pattern 4), for example. It should be noted that the term "setup state" herein means a state in which the work material 50 is provided in the cutting apparatus 10, so that the cutting apparatus 10 can cut the work material 50. At that time, a setup menu, which is within in the operation panel 17, is selected. As illustrated in FIG. 5E, when the cutting apparatus 10 is performing a cutting operation of the work material 50, in other words, when the cutting operation is being carried out properly, the controller 70 supplies electric current to the light source 42 so that the brightness level of the light source 42 becomes 100% (pattern 5).

Figure 5F:
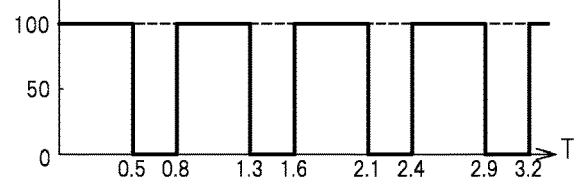
Figure 5G:
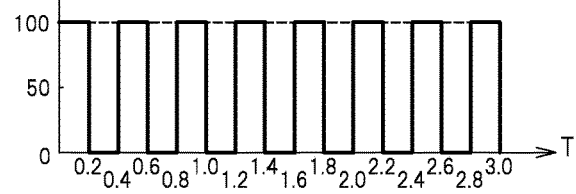

As illustrated in FIG. 5F, when the operator stops the cutting operation before the cutting apparatus 10 completes the cutting operation of the work material 50, the controller 70 supplies electric current to the light source 42 so that the brightness level of the light source 42 defines a cycle of 100%-0% (pattern 6). In the present preferred embodiment, the time for which a brightness level of 100% is continued preferably is set at about 0.5 seconds, and the time for which a brightness level of 0% is continued is preferably set at about 0.3 seconds, for example. As illustrated in FIG. 5G, when an abnormal condition occurs in the cutting apparatus 10 while the cutting apparatus 10 is performing the cutting operation of the work material 50, the controller 70 supplies electric current to the light source 42 so that the brightness level of the light source 42 defines a cycle of 100%-0% (pattern 7). In the present preferred embodiment, the time for which each of the brightness levels preferably is continued is set at about 0.2 seconds, for example. Herein, the term "abnormal condition" means that the cutting apparatus 10 fails to operate properly. For example, the abnormal condition can include a failure of the controller 70, a failure of the moving mechanism 52, and a failure of the cutter moving mechanism 54, in the cutting apparatus 10.

The controller 70 controls the color of the light source 42 according to the status of the cutting apparatus 10. In the present preferred embodiment, the controller 70 controls the light source 42 to be lit in red color when the cutting apparatus 10 is in an abnormal condition, in order to draw the attention of the operator strongly. On the other hand, when the cutting apparatus is 10 in a normal condition other than the abnormal condition, the controller 70 controls the light source 42 to be lit in blue color. It should be noted that the color of the light source 42 controlled by the controller 70 is not limited to the above-described preferred embodiment, but may be set as desired. When the illumination pattern of the light source 42 in a normal condition and that in an abnormal condition are different from each other, it is possible that the controller 70 is configured or programmed to control the color of the light source 42 so that the color of the light source 42 in a normal condition and that in an abnormal condition will be the same.

As described above, in the cutting apparatus 10, an LED is disposed on the carriage 32 that is movable in a predetermined direction. The LED 42 is controlled by the controller 70 so as to be lit in a first illuminating state when the cutting apparatus is 10 in a normal condition, and so as to be lit in a second illuminating state that is different from the first illuminating state when the cutting apparatus 10 is in an abnormal condition. This enables the operator to recognize the status of the cutting apparatus 10 simply by checking the illuminating state of the LED 42, which is mounted on the carriage 32. As a result, even when the operator is working at a location far away from the cutting apparatus 10, the operator is able to easily and reliably recognize the status of the cutting apparatus 10 without checking the display panel 17. In particular, good visibility is ensured when the carriage 32 is in motion, because the LED 42 moves integrally with the carriage 32. Moreover, because the operator is able to perceive the status of the cutting apparatus 10 from the illuminating state of the LED 42, the operator quickly and reliably recognizes the status of the cutting apparatus 10 without checking the display panel 17 even when the room in which the cutting apparatus 10 is disposed is dark.

In the cutting apparatus 10 of the present preferred embodiment, when the cutting apparatus 10 is in a normal condition, the controller 70 preferably controls the LED 42 so that the LED 42 is lit in one of the patterns 1 to 6, while when the cutting apparatus 10 is in an abnormal condition, the controller 70 preferably controls the LED 42 so that the LED 42 is lit in the pattern 7. This enables the operator to easily recognize whether the cutting apparatus 10 is working properly or an abnormal condition is occurring in the cutting apparatus 10 by checking the illumination pattern of the LED 42.

In the cutting apparatus 10 of the present preferred embodiment, when the cutting apparatus 10 is in a normal condition, the controller 70 preferably controls the LED 42 so that the LED 42 is lit in blue color, and when the cutting apparatus 10 is in an abnormal condition, the controller 70 preferably controls the LED 42 so that the LED 42 is lit in red color. This enables the operator to easily recognize whether the cutting apparatus 10 is working properly or an abnormal condition is occurring in the cutting apparatus 10 by checking the color of the LED 42.

In the cutting apparatus 10 of the present preferred embodiment, the cutting apparatus 10 further includes the cover 44, which is fitted to the carriage 32. The cover 44 includes the through-holes 45 transmitting the light emitted from the LED 42, and covers the cutter moving mechanism 54. This makes it possible to increase the safety of the operator without impairing the visibility of the LED 42.

In the cutting apparatus 10 of the present preferred embodiment, the voice coil motor 40 is covered by the cover 44, but the cutter 38 is not covered by the cover 44. This makes the maintenance of the cutter 38 easier and also makes it possible to increase the safety of the operator.

In the cutting apparatus 10 of the present preferred embodiment, the LED 42 is disposed upward relative to the voice coil motor 40. In this way, the LED 42 is disposed away from the voice coil motor 40. This makes it possible to prevent the LED 42 from causing faulty operations that originate from the heat generated by the voice coil motor 40.

Hereinabove, preferred embodiments of the present invention have been described. It should be noted, however, that the foregoing preferred embodiments is merely exemplary, and it is possible to embody the present invention in various other forms.

In the foregoing preferred embodiments, when the cutting apparatus 10 is in an abnormal condition, the controller 70 preferably controls the illuminating state of the light source 42. However, in addition to such controlling, it is possible to use a device such as a beeper, to auditorily notify the operator of the abnormal condition of the cutting apparatus 10.

In the foregoing preferred embodiments, when the cutting apparatus 10 is in a normal condition, the controller 70 preferably supplies electric current to the light source 42 so as to be lit in the above-described pattern 5, and when the cutting apparatus is in an abnormal condition, the controller 70 preferably supplies electric current to the light source 42 so as to be lit in the above-described pattern 7, for example. However, when the color of the light source 42 in a normal condition and that in an abnormal condition are different, the controller 70 may supply electric current to the light source 42 so that the illumination pattern in an abnormal condition will be the same as that in a normal condition.

The terms and expressions which have been used herein are used as terms of description and not of limitation. There is no intention in the use of such terms and expressions of excluding any equivalents of any of the features shown or described, or portions thereof, and it is recognized that various modifications are possible within the scope of the present invention claimed. The present invention may be embodied in many different forms. This disclosure should be considered as providing exemplary preferred embodiments of the principles of the present invention. These preferred embodiments are described herein with the understanding that such preferred embodiments are not intended to limit the present invention to any specific preferred embodiments described and/or illustrated herein. The present invention is not limited to specific preferred embodiments described herein. The present invention encompasses all the preferred embodiments including equivalents, alterations, omissions, combinations, improvements, and/or modifications that can be recognized by those skilled in the arts based on this disclosure. Limitations in the claims should be interpreted broadly based on the language used in the claims, and such limitations should not be limited to specific preferred embodiments described in the present description or provided during prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cutting apparatus comprising:
   a platen on which a work material is to be placed;
   a guide rail disposed above the platen and extending in a primary scanning direction;
   a carriage movable in the primary scanning direction along the guide rail;
   a moving mechanism including a grid roller and a plurality of pinch rollers, and configured to convey the work material in a secondary scanning direction intersecting the primary scanning direction;
   a cutter mounted on the carriage;
   a cutter moving mechanism mounted on the carriage and configured to move the cutter in a direction approaching the work material and in a direction moving away from the work material;
   a light source mounted on the carriage and configured to emit light; and
   a controller configured or programmed to control the light source such that:
      when the cutting apparatus is in a normal condition, the controller controls the light source so that the light source is lit in a first pattern in which (1) when the cutting apparatus is turned on a brightness level of the light source becomes a first amount, (2) when the cutting apparatus is turned on and is in an un-setup state the brightness level of the light source becomes, in order, the first amount, a second amount smaller than the first amount, a third amount smaller than the second amount, the second amount, and the first amount, and (3) when the cutting apparatus is turned on and is in a setup state the brightness level of the light source becomes a fourth amount smaller than the third amount; and
      when the cutting apparatus is in an abnormal condition, the controller controls the light source so that the light source is lit in a second pattern; wherein
   the grid roller is buried in the platen such that an upper surface of the grid roller is exposed;
   the plurality of pinch rollers are located above the grid roller and located below the guide rail and arranged side by side in the primary scanning direction;
   the plurality of pinch rollers are opposed to the grid roller such that the grid roller and the plurality of pinch rollers are located on opposite sides of the work material when the work material is conveyed; and
   the grid roller and the plurality of pinch rollers are configured to convey the work material in the secondary scanning direction while sandwiching the work material therebetween.

2. The cutting apparatus according to claim 1, further comprising a cover fitted to the carriage, including a light transmitting portion configured to transmit light emitted from the light source, and covering the cutter moving mechanism.

3. The cutting apparatus according to claim 2, wherein the cutter moving mechanism includes a voice coil motor; the voice coil motor is covered by the cover; and the cutter is not covered by the cover.

4. The cutting apparatus according to claim 3, wherein the light source is disposed upward or downward relative to the voice coil motor, where the direction in which the cutter approaches the work material is defined as a downward direction, and the direction in which the cutter moves away from the work material is defined as an upward direction.

* * * * *